A. LOKAN.
CAN MAKING MACHINE.
APPLICATION FILED MAY 11, 1918.
1,317,929.
Patented Oct. 7, 1919.
2 SHEETS—SHEET 1.
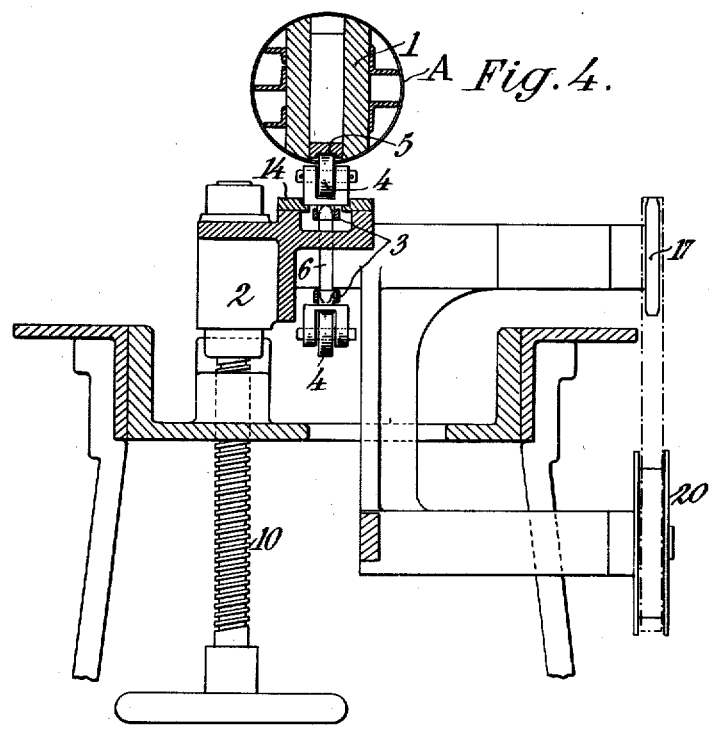
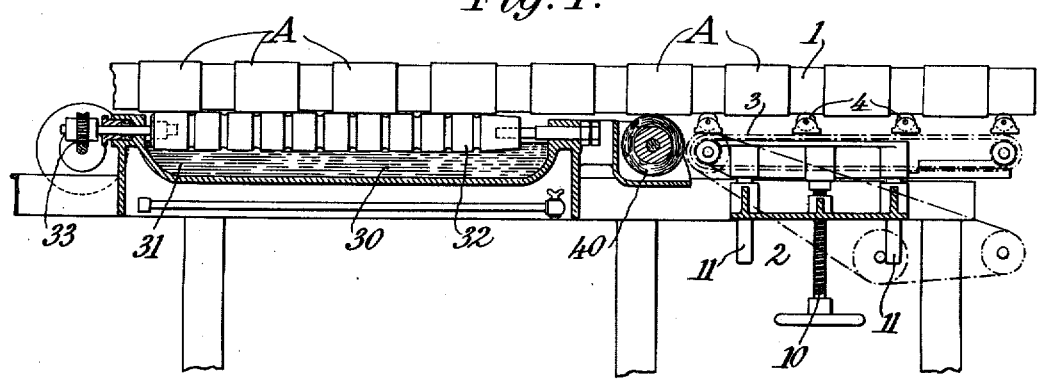
WITNESS:
René Bruine
INVENTOR:
August Lokan,
By Attorneys,
Fraser, Turk & Myers

A. LOKAN.
CAN MAKING MACHINE.
APPLICATION FILED MAY 11, 1918.

1,317,929.

Patented Oct. 7, 1919.
2 SHEETS—SHEET 2.

WITNESS
Rene Bruine

INVENTOR
August Lokan,
By Attorneys,
Fraser, Turk & Myers

UNITED STATES PATENT OFFICE.

AUGUST LOKAN, OF ASTORIA, OREGON, ASSIGNOR TO E. W. BLISS COMPANY, OF BROOKLYN, NEW YORK, A CORPORATION OF WEST VIRGINIA.

CAN-MAKING MACHINE.

1,317,929.      Specification of Letters Patent.      Patented Oct. 7, 1919.

Application filed May 11, 1918. Serial No. 233,845.

*To all whom it may concern:*

Be it known that I, AUGUST LOKAN, a citizen of the United States of America, residing in Astoria, county of Clatsop, and State of Oregon, have invented certain new and useful Improvements in Can-Making Machines, of which the following is a specification.

This invention relates to a machine for making cans, and aims to provide improvements therein.

The bodies of tin cans are now largely made upon a machine known as a body maker, and this machine (when the cans are to be of the sealed type) comprises a horn extension or solder-horn, onto which the tubular can bodies pass from the forming horn. The tubular can bodies pass along the solder horn, and while thereon have solder applied to the seam where the two ends of the body blank are joined.

Solder-horns, as usually made at the present time, are supported at or near the end where the can bodies pass off the same, by a roller, the can bodies, as they move along the solder-horn, passing between the roller and the solder-horn. As each can body passes between the roller and solder-horn, there is a little bump or jar, due to the thickness of the tin of the can bodies.

There are, at the present time, machines upon which can bodies are formed at very nearly the rate of 200 cans per minute. In the very near future, it may be predicted, these machines will be operated at a speed of somewhat more than 200 bodies per minute. At such a rate of speed the bumps or shocks occasioned by the can bodies passing between the solder-horn and a roller support, become very considerable, and, in fact, objectionable, inasmuch as these bumps or jars are sufficient to detach or shake solder from the seams, and hence produce defective or leaky cans, particularly where the solder is applied to the seam at the under side of the horn, as is now generally the case. Such shocks are also likely to cause crystallization or granulation of the solder in cooling, with similar disadvantages.
The present invention provides an improved mechanism or combination, wherein the solder mechanism is located and operates at the under side of the solder-horn, and the solder-horn is supported in such manner that bumps or shocks are avoided as the can bodies pass the support for the solder-horn at or near its discharge end.

An embodiment of the invention is illustrated in the accompanying drawings.

In said drawings,—
Figure 1 illustrates so much of a can making machine as is necessary to disclose the invention, the discharge end of the solder-horn, the solder mechanism and the support for the solder-horn at the discharge end being shown.

Fig. 4 is a section on the line IV—IV, Fig. 2.

Figure 3:
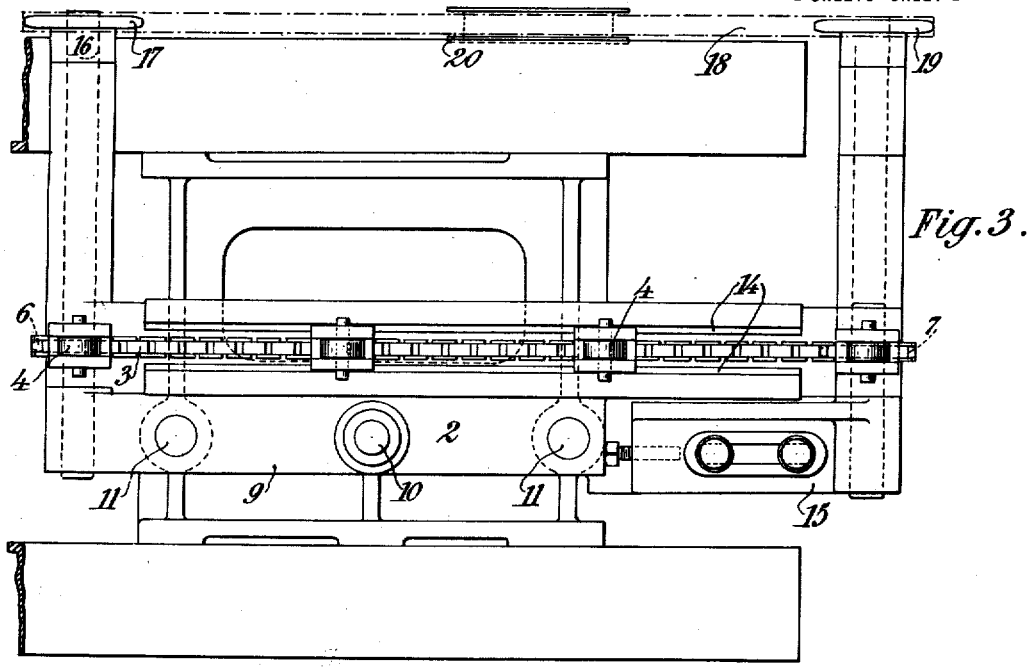
Fig. 3 is a top plan view of the parts shown in Fig. 2, the solder-horn being omitted.
Figure 2:
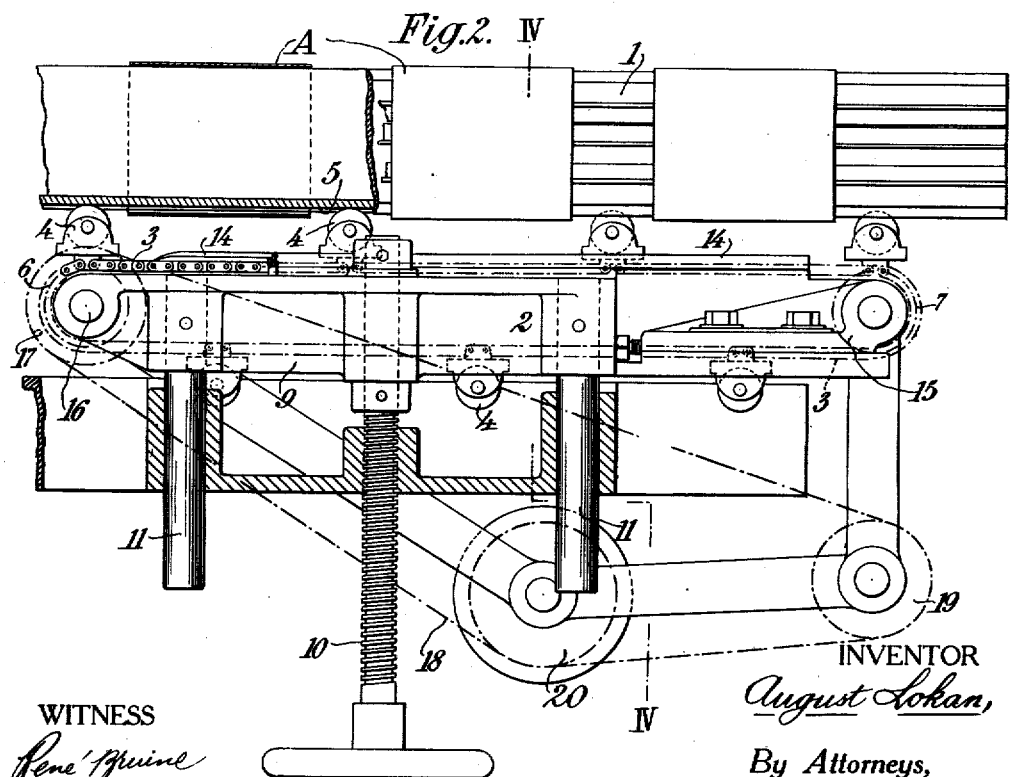
Fig. 2 is an enlarged side elevation, partly in section of the solder-horn support.

Referring to said drawings, numeral 1 designates a horn extension, or solder-horn, of any suitable construction, this solder-horn being usually directly connected at its receiving end to the forming horn of a body-maker.

A, A designate a series of tubular can bodies, which are advanced along the solder-horn in any suitable manner.

2 designates the solder-horn support.

The solder-horn support has portions which bear successively upon the solder-horn at various points longitudinally thereof, in such a manner that the can bodies A may pass, without the can bodies being directly interposed between the solder-horn and the part of the solder-horn support which is acting to support the solder-horn.

As shown in the embodiment illustrated, the support 2 comprises an endless chain 3, carrying spaced projections 4, preferably rollers, and these projections or rollers 4, preferably bear upon the under side of the solder-horn 1, in a groove 5, formed therein. The projections 4 bearing in the groove 5 in the under side of the solder-horn are of advantage in preventing lateral displacement of the solder-horn on the support 2.

The chain 3 runs over sprockets 6 and 7. The chain and sprockets are conveniently carried by a bracket 9, and means, such as a screw shaft 10, is preferably provided for raising and lowering the bracket 9. This adjustability of the solder-horn support permits of the support being brought into position to support solder-horns of different diameters of heights. Guides 11 are preferably provided for the bracket 9, these guides 7 passing through holes in the frame of the machine.

A slide-way 14, is preferably provided upon the bracket 9 for the projections 4 carried by the chain 3.

The bracket 9 is preferably provided with an adjustable part 15 for taking up the slack in the chain 3, one of the sprockets, as the sprocket 7, being mounted upon this adjustable part 15.

The chain 3 may be driven in any suitable manner. As here shown, the sprocket 6 is fixed upon a shaft 16, which has thereon a sprocket 17. The sprocket 17 is driven by a chain 18, passing over a sprocket 19 which is connected in any suitable manner, to a driven part or shaft of the machine. An idler sprocket 20 is provided, which provides for taking up slack in the chain 18, and also enables the chain to be tightened or loosened, as the bracket 9 is adjusted vertically by the screw shaft 10.

The space between the projections 4 is preferably greater than the height of the maximum size can body which the machine is designed to form. The movement of the chain 3 and the feed of the can body is arranged to be at the same rate.

30 designates the solder mechanism. The solder mechanism is preferably located beneath the solder-horn 1, and it may conveniently comprise a solder tank or trough 31, and a roll 32, dipping in the molten solder, and rotated by any suitable means, such as a gear 33 and associated transmission.

In operation, formed can bodies A, with the seam at the under side, pass along the solder-horn 1. Over the solder roll 32 the can bodies pass just near enough to the film of liquid solder upon the solder roll, to be "wet" thereby, the solder being thereby applied to the seam upon the can body. After passing the solder roll, excess solder may be wiped from the seam, as is usual, by a brush or wiper 40. Thence the can bodies pass to the discharge end of the solder-horn, the solder solidifying during this period, or as is usual, being solidified by jets of cool air directed against the under side of the can bodies. The can bodies pass over the support 2 without the bodies passing between the solder-horn and an active part of the solder-horn support, thereby bumps or shocks to the solder-horn, and the can bodies carried thereby, being avoided, and thereby the jolting or knocking of solder out of the seam being avoided.

The invention may be embodied otherwise than herein illustrated and specifically described.

What I claim is:—

1. A machine for making cans, comprising a solder-horn and means for supporting the same, said means comprising a slide parallel to the underside of the solder-horn, and spaced horn-supporting parts traveling along said slide and contacting with said horn at points between the space between two can bodies on the horn, whereby said horn is supported without said supports coming in contact with a can body or its edge, said horn supporting parts being spaced at such intervals that two at least thereof are constantly in supporting contact with said horn.

2. A machine for making cans, comprising a solder-horn and means for supporting the same, said means comprising a slide parallel to the underside of the solder-horn, an endless chain, said chain having horn-supporting projections thereon, said chain traveling along said slide and said projections contacting with said horn at points between the space between two can bodies on the horn, whereby said horn is supported without said supports coming in contact with a can body or its edge, said horn supporting parts being spaced at such intervals that two at least thereof are constantly in supporting contact with said horn.

In witness whereof I have hereunto signed my name.

AUGUST LOKAN.